United States Patent [19]
Lloyd

[11] Patent Number: 5,106,391
[45] Date of Patent: Apr. 21, 1992

[54] MANUFACTURE OF AN ABRASIVE BODY

[76] Inventor: Andrew I. Lloyd, 52 15th Street, Parkhurst, Johannesburg, Transvaal, South Africa

[21] Appl. No.: 549,443

[22] Filed: Jul. 6, 1990

[30] Foreign Application Priority Data

Jul. 7, 1989 [ZA] South Africa .............. 89/5183

[51] Int. Cl.$^5$ .............................................. B24D 3/00
[52] U.S. Cl. ...................................... 51/293; 51/295; 51/309
[58] Field of Search .......................... 51/293, 295, 309

[56] References Cited

U.S. PATENT DOCUMENTS

| | | | |
|---|---|---|---|
| 4,219,339 | 8/1980 | Wilson | 51/307 |
| 4,496,372 | 1/1985 | Almond et al. | 51/293 |
| 4,525,178 | 6/1985 | Hall | 51/293 |
| 4,604,106 | 8/1986 | Hall et al. | 51/293 |
| 4,690,691 | 9/1987 | Komanduri | 51/295 |
| 4,959,929 | 10/1990 | Burnaud et al. | 51/293 |
| 5,009,693 | 4/1991 | Cho | 51/293 |
| 5,032,147 | 7/1991 | Frushour | 51/293 |

Primary Examiner—William R. Dixon, Jr.
Assistant Examiner—Willie J. Thompson
Attorney, Agent, or Firm—Scully, Scott, Murphy & Presser

[57] ABSTRACT

A method of producing an abrasive body which consists of an abrasive compact sandwiched between layers of cemented carbide. The method includes the steps of providing an unbonded structure comprising a layer of ultra-hard abrasive particles sandwiched between two carbide layers. Each carbide layer is a layer of cemented carbide or a layer containing the components necessary to produce cemented carbide. The two carbide layers and the sandwiched layer each contain a binder metal selected from cobalt, nickel, iron and the like. The concentration of binder metal in the sandwiched layer is less than the concentration of the binder metal in one of the carbide layers, and is higher than the concentration in the binder metal in the other carbide layer. The unbonded structure is subjected to conditions of elevated temperature suitable to produce the abrasive body.

6 Claims, 1 Drawing Sheet

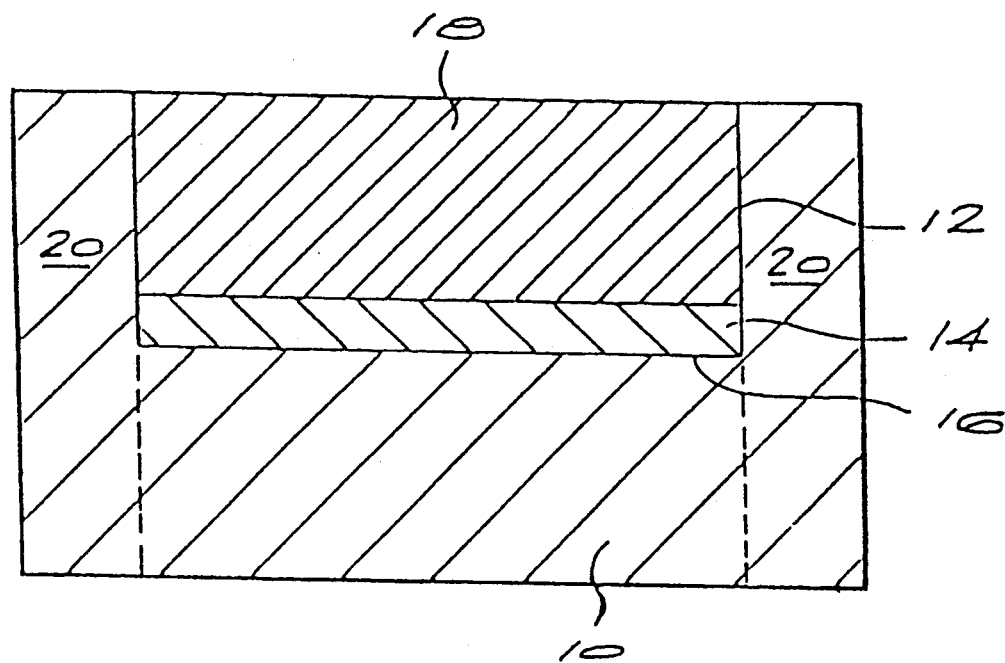
_Fig 1_
_Fig 2_
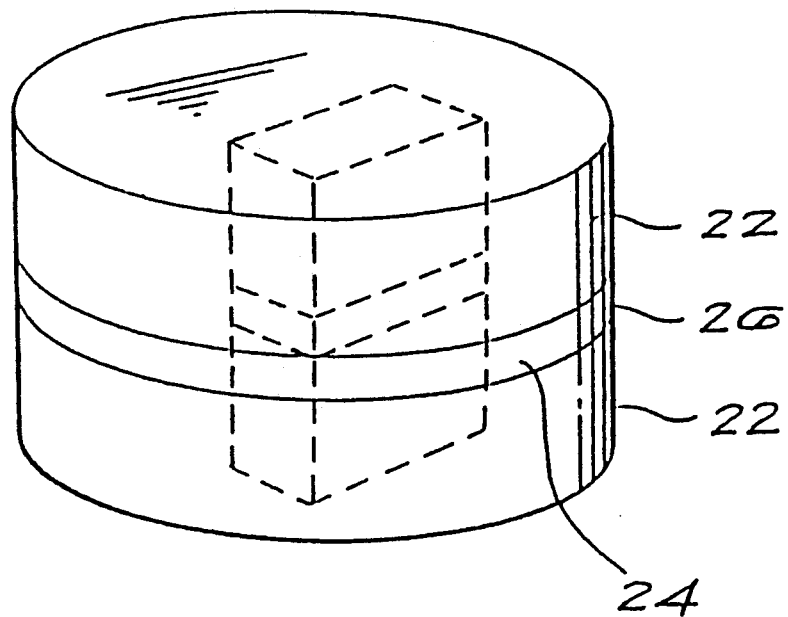

MANUFACTURE OF AN ABRASIVE BODY

BACKGROUND OF THE INVENTION

This invention relates to the manufacture of abrasive bodies.

U.S. Pat. No. 4,219,339 describes and claims an abrasive body which includes a plate-like abrasive compact having opposed major flat surfaces and comprising a mass of abrasive particles, present in an amount of at least 70% by volume of the compact, bonded into a hard conglomerate. Separate cemented carbide supports are bonded to each of the major surfaces. Each support covers substantially the whole surface to which it is bonded. At least one side of the abrasive compact is exposed to present a cutting edge or surface.

The abrasive compact will generally be a diamond or cubic boron nitride abrasive compact and the cemented carbide may be any known in the art.

This abrasive body has application, in particular, as an insert for a dressing tool or a drill bit. When used as an insert for a drill bit, the abrasive body will be located in a groove formed in the working end of the drill bit and the carbide supports then profiled to conform to the profile of the drill bit. The body can also be used for point attack cutters in mining applications where the top carbide layer acts as a buffer to prevent chipping/spalling of the diamond layer, especially during running-in.

SUMMARY OF THE INVENTION

According to the present invention, a method of producing an abrasive body, particularly one of type described above, includes the steps of:

(i) providing an unbonded structure comprising a layer of ultra-hard abrasive particles sandwiched between two carbide layers, each carbide layer being a layer of cemented carbide or a layer containing the components necessary to produce a cemented carbide, the two carbide layers and the sandwiched layer each containing a binder metal selected from cobalt, nickel, iron and the like, and the concentration of the binder metal in the sandwiched layer being less than the concentration of the binder metal in one of the carbide layers and being higher than the concentration of the binder metal in the other carbide layer; and (ii) subjecting the unbonded structure to conditions of elevated temperature and pressure suitable to produce the abrasive body.

DESCRIPTION OF THE DRAWING

FIG. 1 illustrates a sectional side view of an unbonded structure suitable for carrying out the method of the invention.

FIG. 2 illustrates a perspective view of an abrasive body produced by the method of the invention.

DESCRIPTION OF EMBODIMENTS

The abrasive body which is produced by the method of the invention comprises an abrasive compact sandwiched between cemented carbide supports to which it is bonded. In particular, the abrasive body may be of the type described in the above mentioned U.S. patent. The abrasive compact will generally be a diamond abrasive compact.

The carbide layers may be cemented carbide (also known as sintered carbide), partially sintered carbide, green state carbide or a powdered mixture suitable to make the cemented carbide, or combination thereof. In one form of the invention the one carbide layer is of cemented carbide while the other carbide layer is of a green state carbide.

It is an important aspect of the invention that the binder content of each of the layers is different from any of the other lays and that the concentrations in the layers form a gradient from the one carbide layer to the other, i.e. the concentration of binder metal in the sandwiched layer is less than the concentration of binder metal in the one carbide layer and higher than the binder meal concentration in the other carbide layer. This, it has been found, ensures that an effective abrasive compact is formed which is integrally bonded to the carbide layers on either side of it.

The concentration of the binder metal in each layer will vary according to the nature of the product being produced. Generally, the concentration of binder metal in each layer will not exceed 15% by weight. Typically, the one carbide layer contains 11 to 13% by weight of binder metal, the other carbide layer a binder metal concentration of 4 to 6% by weight and the sandwiched layer a concentration of binder metal of 8 to 10% by weight.

The conditions of elevated temperature and pressure which are used will be those required to produce an abrasive compact. Typically, the elevated temperature will be in the range of 1400° to 1600° C. and the elevated pressure will be in the range of 50 to 70 kilobars. Typically, these conditions of elevated temperature and pressure will be maintained for a period of up to 40 minutes.

An embodiment of the invention will now be described with reference to the accompanying drawing. Referring to this drawing, there is shown a cemented carbide bowl 10 which is circular in plan. The bowl 10 has a cavity 12 which is also circular in plan. A layer 14 of a powdered mixture of cobalt and diamond particles is placed on the base 16 of the cavity 12 and thereafter a pre-compacted green state carbide body 18 is placed on top of the cobalt/diamond mixture 14 to fill the cavity 12. The cemented carbide of the bowl 10 contains 11% to 13% by weight cobalt, the cobalt/diamond mixture 14 contains 10% by weight cobalt and the green state carbide body 18 contains 6% by weight cobalt. The carbide is tungsten carbide.

The loaded bowl 10 is placed in a suitable reaction capsule which is then placed in the reaction zone of a conventional high pressure/high temperature apparatus. The contents of the reaction capsule are subjected to a temperature of 1500° C. and a pressure of 50 kilobars. These elevated conditions are maintained for a period of 20 minutes. Under these conditions of elevated temperature and pressure, a diamond compact is formed from the layer 14 and the green state carbide 18 converted to cemented carbide. These layers are bonded to each other and to the carbide bowl 10.

The sintered product is recovered from the reaction capsule using standard techniques and then the side zone 20 of the bowl removed by grinding or like means. This leaves an abrasive body as illustrated by FIG. 2 which consists of disc-shaped sintered carbide layers 22 and a diamond abrasive compact 24 sandwiched therebetween. The peripheral surface 26 of the abrasive compact provides a cutting surface. If desired, the carbide layers adjacent the compact cutting surface 26 can be cut away or otherwise profiled to expose better the compact cutting surface 26.

Further, from this product a variety of other bodies of different shapes such as square, oblong, triangle or the like can be cut. One such shape is illustrated by dotted lines in FIG. 2.

I claim:

1. A method for producing an abrasive body includes the steps of:
   (i) providing an unbonded structure comprising a layer of ultra-hard abrasive particles sandwiched between two carbide layers, each carbide layer being a layer of cemented carbide or a layer containing the components necessary to produce a cemented carbide, the two carbide layers and the sandwiched layer each containing a binder metal selected from cobalt, nickel, iron and the like, and the concentration of the binder metal in the sandwiched layer being less than the concentration of the binder metal in one of the carbide layers and being higher than the concentration of the binder metal in the other carbide layer; and
   (ii) subjecting the unbonded structure to conditions of elevated temperature and pressure suitable to produce the abrasive body.

2. A method according to claim 1 wherein the concentration of binder metal in each layer does not exceed 15% by weight.

3. A method according to claim 1 wherein the concentration of binder metal is one of the carbide layers is in the range 11 to 13%, is in the range 4 to 6% by weight in the other carbide layer, and is in the range 8 to 10% by weight in the sandwiched layer.

4. A method according to claim 1 wherein the one carbide layer is of cemented carbide and the other carbide layer is of a green state carbide.

5. A method according to claim 1 wherein the ultra-hard abrasive particles are diamond particles.

6. A method according to claim 1 wherein the elevated temperature is in the range 1400° to 1600° C., the elevated pressure is in the range of 50 to 70 kilobars, and these elevated conditions are maintained for a period of up to 40 minutes.

* * * * *

UNITED STATES PATENT AND TRADEMARK OFFICE
CERTIFICATE OF CORRECTION

PATENT NO. : 5,106,391
DATED     : April 21, 1992
INVENTOR(S) : Andrew Ian Lloyd It is certified that error appears in the above-identified patent and that said Letters Patent is hereby corrected as shown below:

Column 2, line 7:   "lays"   should read as  --layers--
    Column 2, line 12:  "meal"   should read as  --metal--

Column 4, line 8, Claim 3: "metal is" should read as --metal in--.

Signed and Sealed this

Twenty-first Day of September, 1993

Attest:

BRUCE LEHMAN

Attesting Officer    Commissioner of Patents and Trademarks